(12) United States Patent
Dempsey et al.

(10) Patent No.: US 6,195,565 B1
(45) Date of Patent: Feb. 27, 2001

(54) BANDWIDTH CONTROL IN A PACKET-BASED DATA SYSTEM

(75) Inventors: Peter A. Dempsey, Convent Station, NJ (US); Kyoo J. Lee, Acton, MA (US); Stuart Warmink, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/033,985

(22) Filed: Mar. 3, 1998

(51) Int. Cl.$^7$ .............................. H04B 7/216; H04Q 7/00
(52) U.S. Cl. .................... 455/561; 455/38.1; 455/177.1; 455/266; 370/342
(58) Field of Search ..................................... 455/557, 454, 455/177.1, 266, 5.1, 132–134, 6.3, 38.1, 561; 370/414, 468, 342, 441, 442, 320, 335, 310, 389

(56) References Cited

U.S. PATENT DOCUMENTS

| | | | |
|---|---|---|---|
| 4,409,592 | 10/1983 | Hunt | 340/825.5 |
| 4,866,788 | 9/1989 | Mouly et al. | 455/9 |
| 5,331,316 | * 7/1994 | Mestdagh et al. | 340/825.03 |
| 5,402,422 | * 3/1995 | Liu et al. | 370/443 |
| 5,421,030 | * 5/1995 | Baran | 455/5.1 |
| 5,648,958 | * 7/1997 | Counterman | 370/458 |
| 5,831,976 | * 11/1998 | Lin et al. | 370/329 |
| 5,844,906 | * 12/1998 | Khelghatti et al. | 370/474 |
| 5,926,476 | * 7/1999 | Ghaibeh | 370/395 |
| 5,943,316 | * 8/1999 | Davis | 370/232 |
| 6,009,468 | * 12/1999 | Lau et al. | 709/225 |
| 6,014,385 | * 1/2000 | Ayanoglu et al. | 370/458 |
| 6,061,339 | * 5/2000 | Nieczyporowicz et al. | 370/335 |

* cited by examiner

Primary Examiner—Lee Nguyen
Assistant Examiner—Simon Nguyen
(74) Attorney, Agent, or Firm—Steve Mendelsohn

(57) ABSTRACT

A data system, such as a computer network or a telecommunications system, has a base station and a number of nodes called network interface units (NIUs). Each NIU is assigned to one of a number of groups of NIUs. The base station transmits special data to the NIUs indicating which groups of NIUs are currently authorized to transmit upstream messages to the base station, where only the authorized NIUs are allowed to transmit upstream messages. When message collisions in the upstream direction becomes a problem, the base station can reduce the number of NIU groups that are authorized at any given time to transmit upstream messages, in order to attempt to reduce the rate of message collisions. In one possible embodiment, each NIU is assigned horizontal and vertical group words that identify to which group it is assigned. The special data contain additional horizontal and vertical code words that are monitored by the NIUs. If the bits in the downstream code words appropriately match the corresponding bits in the NIU's assigned group words, then the NIU recognizes that it is authorized to transmit upstream messages to the base station. Otherwise, it is not. The horizontal and vertical code words correspond to two-dimensional patterns that indicate which subset of NIU groups are authorized at any given time. By cycling through a series of 2D patterns, the base station ensures that each NIU is authorized at least some of the time. Depending on the number of bits in the code words, a back-off scheme can be designed with different back-off levels, each of which authorizes a different number of groups to transmit. The base station can progressively decrease the rate of upstream transmission by selecting back-off levels with fewer and fewer NIU groups authorized to transmit.

21 Claims, 9 Drawing Sheets

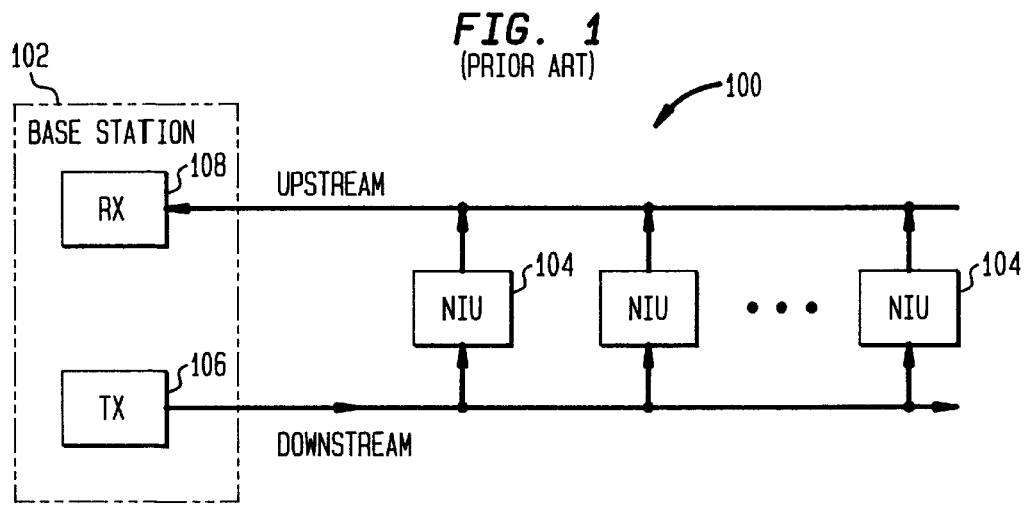

FIG. 4A

HORIZONTAL WORD

|  | BIT1=1 | BIT2=0 |
|---|---|---|
| VERTICAL WORD  BIT1=1 | GROUP 1 ON | GROUP 2 OFF |
| BIT2=1 | GROUP 3 ON | GROUP 4 OFF |

FIG. 4B

HORIZONTAL WORD

|  | BIT1=0 | BIT2=1 |
|---|---|---|
| VERTICAL WORD  BIT1=1 | GROUP 1 OFF | GROUP 2 ON |
| BIT2=1 | GROUP 3 OFF | GROUP 4 ON |

FIG. 5A

HORIZONTAL WORD

|  | BIT1=1 | BIT2=0 |
|---|---|---|
| VERTICAL WORD  BIT1=1 | GROUP 1 ON | GROUP 2 OFF |
| BIT2=0 | GROUP 3 OFF | GROUP 4 OFF |

FIG. 5B

HORIZONTAL WORD

|  | BIT1=1 | BIT2=0 |
|---|---|---|
| VERTICAL WORD  BIT1=0 | GROUP 1 OFF | GROUP 2 OFF |
| BIT2=1 | GROUP 3 ON | GROUP 4 OFF |

FIG. 5C

HORIZONTAL WORD

|  | BIT1=0 | BIT2=1 |
|---|---|---|
| VERTICAL WORD  BIT1=1 | GROUP 1 OFF | GROUP 2 ON |
| BIT2=0 | GROUP 3 OFF | GROUP 4 OFF |

FIG. 5D

HORIZONTAL WORD

|  | BIT1=0 | BIT2=1 |
|---|---|---|
| VERTICAL WORD  BIT1=0 | GROUP 1 OFF | GROUP 2 OFF |
| BIT2=1 | GROUP 3 OFF | GROUP 4 ON |

FIG. 6

HORIZONTAL WORD

|  | BIT1 | BIT2 | BIT3 | BIT4 |
|---|---|---|---|---|
| BIT1 | GROUP 1 | GROUP 2 | GROUP 3 | GROUP 4 |
| BIT2 | GROUP 5 | GROUP 6 | GROUP 7 | GROUP 8 |
| BIT3 | GROUP 9 | GROUP 10 | GROUP 11 | GROUP 12 |
| BIT4 | GROUP 13 | GROUP 14 | GROUP 15 | GROUP 16 |

VERTICAL WORD

FIG. 7A

HORIZONTAL WORD

|  | BIT1=1 | BIT2=1 | BIT3=1 | BIT4=0 |
|---|---|---|---|---|
| BIT1=1 | GROUP 1 ON | GROUP 2 ON | GROUP 3 ON | GROUP 4 OFF |
| BIT2=1 | GROUP 5 ON | GROUP 6 ON | GROUP 7 ON | GROUP 8 OFF |
| BIT3=1 | GROUP 9 ON | GROUP 10 ON | GROUP 11 ON | GROUP 12 OFF |
| BIT4=1 | GROUP 13 ON | GROUP 14 ON | GROUP 15 ON | GROUP 16 OFF |

VERTICAL WORD

FIG. 7B

HORIZONTAL WORD

|  | BIT1=1 | BIT2=1 | BIT3=0 | BIT4=1 |
|---|---|---|---|---|
| BIT1=1 | GROUP 1 ON | GROUP 2 ON | GROUP 3 OFF | GROUP 4 ON |
| BIT2=1 | GROUP 5 ON | GROUP 6 ON | GROUP 7 OFF | GROUP 8 ON |
| BIT3=1 | GROUP 9 ON | GROUP 10 ON | GROUP 11 OFF | GROUP 12 ON |
| BIT4=1 | GROUP 13 ON | GROUP 14 ON | GROUP 15 OFF | GROUP 16 ON |

VERTICAL WORD

FIG. 7C

HORIZONTAL WORD

|  | BIT1=1 | BIT2=0 | BIT3=1 | BIT4=1 |
|---|---|---|---|---|
| BIT1=1 | GROUP 1 ON | GROUP 2 OFF | GROUP 3 ON | GROUP 4 ON |
| BIT2=1 | GROUP 5 ON | GROUP 6 OFF | GROUP 7 ON | GROUP 8 ON |
| BIT3=1 | GROUP 9 ON | GROUP 10 OFF | GROUP 11 ON | GROUP 12 ON |
| BIT4=1 | GROUP 13 ON | GROUP 14 OFF | GROUP 15 ON | GROUP 16 ON |

VERTICAL WORD

FIG. 7D

HORIZONTAL WORD

|  | BIT1=0 | BIT2=1 | BIT3=1 | BIT4=1 |
|---|---|---|---|---|
| BIT1=1 | GROUP 1 OFF | GROUP 2 ON | GROUP 3 ON | GROUP 4 ON |
| BIT2=1 | GROUP 5 OFF | GROUP 6 ON | GROUP 7 ON | GROUP 8 ON |
| BIT3=1 | GROUP 9 OFF | GROUP 10 ON | GROUP 11 ON | GROUP 12 ON |
| BIT4=1 | GROUP 13 OFF | GROUP 14 ON | GROUP 15 ON | GROUP 16 ON |

VERTICAL WORD

FIG. 8A

HORIZONTAL WORD

|  | BIT1=1 | BIT2=1 | BIT3=1 | BIT4=0 |
|---|---|---|---|---|
| BIT1=1 | GROUP 1 ON | GROUP 2 ON | GROUP 3 ON | GROUP 4 OFF |
| BIT2=1 | GROUP 5 ON | GROUP 6 ON | GROUP 7 ON | GROUP 8 OFF |
| BIT3=1 | GROUP 9 ON | GROUP 10 ON | GROUP 11 ON | GROUP 12 OFF |
| BIT4=0 | GROUP 13 OFF | GROUP 14 OFF | GROUP 15 OFF | GROUP 16 OFF |

VERTICAL WORD (row labels)

FIG. 8B

HORIZONTAL WORD

|  | BIT1=1 | BIT2=1 | BIT3=0 | BIT4=1 |
|---|---|---|---|---|
| BIT1=1 | GROUP 1 ON | GROUP 2 ON | GROUP 3 OFF | GROUP 4 ON |
| BIT2=1 | GROUP 5 ON | GROUP 6 ON | GROUP 7 OFF | GROUP 8 ON |
| BIT3=0 | GROUP 9 OFF | GROUP 10 OFF | GROUP 11 OFF | GROUP 12 OFF |
| BIT4=1 | GROUP 13 ON | GROUP 14 ON | GROUP 15 OFF | GROUP 16 ON |

VERTICAL WORD (row labels)

FIG. 8C

HORIZONTAL WORD

|  | BIT1=1 | BIT2=0 | BIT3=1 | BIT4=1 |
|---|---|---|---|---|
| BIT1=1 | GROUP 1 ON | GROUP 2 OFF | GROUP 3 ON | GROUP 4 ON |
| BIT2=0 | GROUP 5 OFF | GROUP 6 OFF | GROUP 7 OFF | GROUP 8 OFF |
| BIT3=1 | GROUP 9 ON | GROUP 10 OFF | GROUP 11 ON | GROUP 12 ON |
| BIT4=1 | GROUP 13 ON | GROUP 14 OFF | GROUP 15 ON | GROUP 16 ON |

VERTICAL WORD

FIG. 8D

HORIZONTAL WORD

|  | BIT1=0 | BIT2=1 | BIT3=1 | BIT4=1 |
|---|---|---|---|---|
| BIT1=0 | GROUP 1 OFF | GROUP 2 OFF | GROUP 3 OFF | GROUP 4 OFF |
| BIT2=1 | GROUP 5 OFF | GROUP 6 ON | GROUP 7 ON | GROUP 8 ON |
| BIT3=1 | GROUP 9 OFF | GROUP 10 ON | GROUP 11 ON | GROUP 12 ON |
| BIT4=1 | GROUP 13 OFF | GROUP 14 ON | GROUP 15 ON | GROUP 16 ON |

VERTICAL WORD

FIG. 9A

HORIZONTAL WORD

|  | BIT1=1 | BIT2=1 | BIT3=0 | BIT4=0 |
|---|---|---|---|---|
| BIT1=1 | GROUP 1 ON | GROUP 2 ON | GROUP 3 OFF | GROUP 4 OFF |
| BIT2=1 (VERTICAL WORD) | GROUP 5 ON | GROUP 6 ON | GROUP 7 OFF | GROUP 8 OFF |
| BIT3=1 | GROUP 9 ON | GROUP 10 ON | GROUP 11 OFF | GROUP 12 OFF |
| BIT4=1 | GROUP 13 ON | GROUP 14 ON | GROUP 15 OFF | GROUP 16 OFF |

FIG. 9B

HORIZONTAL WORD

|  | BIT1=0 | BIT2=0 | BIT3=1 | BIT4=1 |
|---|---|---|---|---|
| BIT1=1 | GROUP 1 OFF | GROUP 2 OFF | GROUP 3 ON | GROUP 4 ON |
| BIT2=1 (VERTICAL WORD) | GROUP 5 OFF | GROUP 6 OFF | GROUP 7 ON | GROUP 8 ON |
| BIT3=1 | GROUP 9 OFF | GROUP 10 OFF | GROUP 11 ON | GROUP 12 ON |
| BIT4=1 | GROUP 13 OFF | GROUP 14 OFF | GROUP 15 ON | GROUP 16 ON |

FIG. 10A

HORIZONTAL WORD

|  | BIT1=1 | BIT2=1 | BIT3=1 | BIT4=1 |
|---|---|---|---|---|
| BIT1=1 | GROUP 1 ON | GROUP 2 ON | GROUP 3 ON | GROUP 4 ON |
| BIT2=1 | GROUP 5 ON | GROUP 6 ON | GROUP 7 ON | GROUP 8 ON |
| BIT3=1 | GROUP 9 ON | GROUP 10 ON | GROUP 11 ON | GROUP 12 ON |
| BIT4=0 | GROUP 13 OFF | GROUP 14 OFF | GROUP 15 OFF | GROUP 16 OFF |

VERTICAL WORD

FIG. 10B

HORIZONTAL WORD

|  | BIT1=1 | BIT2=1 | BIT3=1 | BIT4=1 |
|---|---|---|---|---|
| BIT1=1 | GROUP 1 ON | GROUP 2 ON | GROUP 3 ON | GROUP 4 ON |
| BIT2=1 | GROUP 5 ON | GROUP 6 ON | GROUP 7 ON | GROUP 8 ON |
| BIT3=0 | GROUP 9 OFF | GROUP 10 OFF | GROUP 11 OFF | GROUP 12 OFF |
| BIT4=1 | GROUP 13 ON | GROUP 14 ON | GROUP 15 ON | GROUP 16 ON |

VERTICAL WORD

BANDWIDTH CONTROL IN A PACKET-BASED DATA SYSTEM

BACKGROUND OF THE INVENTION

1. Field of the Invention

The present invention relates to the control of bandwidth in a packet-based data system.

2. Description of the Related Art

FIG. 1 shows a schematic block diagram of a conventional multipoint-to-point packet-based data system 100, such as those used for computer networks and telecommunications systems, in which a base station 102 communicates with a number of network nodes referred to here as network interface units (NIUs) 104. In the downstream direction, transmitter 106 of base station 102 transmits packets of data to the NIUs 104. In the upstream direction, one or more of the NIUs 104 transmit packets of data to receiver 108 of base station 102. In one possible implementation, the data packets are interleaved in the upstream and downstream directions using a time division multiple access (TDMA) scheme. The base station and the NIUs are the various nodes in the data system, with the base station controlling the bandwidth in the network (e.g., the allocation to the various NIUs of time slots for upstream transmissions).

When used, for example, in a telecommunications application, each NIU 104 in data system 100 provides the interface to the data system for a telephone or other node in the network, and base station 102 may be a switch in a central office or other component that communicates with multiple NIUs. In such an application, each NIU 104 is capable of sending control messages to base station 102. Control messages are information exchanged between NIUs and the base station that allow the base station to properly monitor and maintain communication channels within the allocated bandwidth of the communication system. The control messages may be embedded, for example, in the packets sent from the NIU to the base station in the upstream direction using the well-known slotted ALOHA technique. When a phone call is to be terminated at a particular NIU 104, the base station 102 assigns a particular channel for that NIU to use for its upstream communications. However, when a particular NIU wants to initiate a phone call, it must send an upstream control message to the base station requesting bandwidth for the phone call. Since the NIU does not have a particular channel already assigned, it may arbitrarily or randomly select a channel for its bandwidth request message. This upstream message may collide with one or more other upstream messages being sent to the base station from one or more other NIUs in the same channel, leading to corrupted messages which the base station cannot accurately process.

According to the slotted ALOHA technique, a collision/back-off algorithm is followed when two or more NIUs attempt to send such control messages at the same time to ensure successful NIU-to-base-unit message communications. One conventional collision/back-off algorithm calls for each competing NIU to retransmit its bandwidth request after delaying for a random period of time. Unfortunately, when many NIUs attempt to send control messages at the same time, the resulting collisions, retries, and further collisions may effectively block almost all upstream message transmission. This is undesirable, since such an overload condition could in theory happen during exceptionally high call volumes, which would limit the ability of the system to allocate bandwidth to the NIUs (e.g., providing dial tone to new calls for telephony systems).

SUMMARY OF THE INVENTION

The present invention is directed to a back-off strategy that addresses the problems that can arise from message collisions in heavily populated packet-based data systems.

According to one embodiment, the present invention is a method of controlling bandwidth in a packet-based data system comprising a base station and a plurality of network interface units (NIUs). The base station transmits special data to the NIUs, wherein the NIUs are organized into two or more groups and the special data identify which groups of NIUs are authorized to transmit upstream messages to the base station. Only authorized NIUs transmit upstream messages to the base station.

BRIEF DESCRIPTION OF THE DRAWINGS

Other aspects, features, and advantages of the present invention will become more fully apparent from the following detailed description, the appended claims, and the accompanying drawings in which:

FIG. 1 shows a schematic block diagram of a conventional packet-based data system;

FIG. 2 presents a pictorial representation of how two-bit group words can be used to identify four different NIU groups;

FIG. 3 shows the status of the four NIU groups when all bits in the code words are set;

FIGS. 4(A)–(B) shows a $1^{st}$ Back-Off Level for two-bit code words;

FIGS. 5(A)–(D) shows a $2^{nd}$ Back-Off Level for two-bit code words;

FIG. 6 presents a pictorial representation of how four-bit group words can be used to identify sixteen different NIU groups;

FIGS. 7(A)–(D) shows a $1^{st}$ Back-Off Level for four-bit code words;

FIGS. 8(A)–(D) shows a $2^{nd}$ Back-Off Level for four-bit code words;

FIGS. 9(A)–(B) shows a $3^{rd}$ Back-Off Level for four-bit code words; and

FIGS. 10(A)–(B) shows an alternative $1^{st}$ Back-Off Level for four-bit code words.

DETAILED DESCRIPTION

The present invention is directed to a scheme for controlling bandwidth in a packet-based data system, such as data system 100 of FIG. 1. In data system 100, a specified frame structure is used to organize data for transmission in the downstream direction from the base station 102 to the various NIUs 104. According to the invention, the network interface units (e.g., NIUs 104 of FIG. 1) are organized into two or more groups and the base station (e.g., 102 in FIG. 1) transmits special data contained within the downstream frames to the NIUs that identify which groups of NIUs are authorized to transmit upstream messages to the base station. In one embodiment, the special data are broadcast to all of the NIUs. The NIUs monitor the special data in the downstream frames to determine whether they are so authorized. In general, the data system may be any suitable type of communications network, such as a local area network for computers or a telecommunications network. In the case of a telecommunications network, the upstream messages transmitted to the base station may be requests from the NIUs for bandwidth to set up phone calls.

In one embodiment of the present invention, each group of NIUs is identified by the bits contained in two group words: a horizontal group word and a vertical group word. For example, in one possible implementation, the horizontal and vertical group words are both 2-bit words that uniquely identify four different groups of NIUs, as defined in Table I. Each NIU is assigned a horizontal group word and a vertical group word that identifies to which group it belongs. In general, the horizontal and vertical group words can be any n-bit and m-bit words, respectively, with only one bit set (=1) in each group word.

TABLE I

GROUPS DEFINED BY TWO 2-BIT GROUP WORDS

| GROUP | HORIZONTAL GROUP WORD | VERTICAL GROUP WORD |
|---|---|---|
| 1 | (10) | (10) |
| 2 | (01) | (10) |
| 3 | (10) | (01) |
| 4 | (01) | (01) |

FIG. 2 presents a pictorial representation of how the two-bit group words of Table I identify the four different NIU groups. For example, if Bit 1 of the horizontal group word is set and Bit 1 of the vertical group word is set, then the NIU belongs to Group 1. Similarly, if Bit 2 of the horizontal group word is set and Bit 1 of the vertical group word is set, then the NIU belongs to Group 2, and so forth for Groups 3 and 4.

The special data sent from the base station to the NIUs contain two code words (i.e., a 2-bit horizontal code word and a 2-bit vertical code word) that correspond to the horizontal and vertical group words assigned to each NIU. The horizontal and vertical code words contained in the special data define a two-dimensional (2D) pattern that identifies which groups of NIUs are currently authorized to transmit upstream messages to the base station. Each NIU compares its assigned group words to the contents in the downstream code words to determine whether it is currently authorized to transmit upstream messages to the base station. In one possible implementation (called Implementation Rule #1), an NIU is said to be so authorized only if both of the bits in the horizontal and vertical downstream code words corresponding to the bits that are set in the NIU's horizontal and vertical group words are set. In another possible implementation (called Implementation Rule #2), an NIU is said to be so authorized if either of the bits in the horizontal and vertical downstream code words corresponding to the bits that are set in the NIU's horizontal and vertical group words is set. These different implementations are described in further detail below.

Implementation Rule #1 with 2-Bit Words

According to the present invention, when there are relatively few collisions between upstream messages (i.e., when two or more NIUs rarely attempt to send upstream messages within the same time slot), all of the groups of NIUs can be authorized to transmit upstream messages as needed. In this case, both the horizontal and vertical 2-bit code words contained within the downstream frames will have all of their bits set and the corresponding 2D pattern is shown in FIG. 3. As such, each and every NIU will compare its assigned group words to the corresponding code words in the downstream frames to determine whether it is authorized to transmit upstream messages.

In one embodiment, the base station keeps track of a running average of the number of collisions detected, which provides an indication of upstream overload. As traffic increases and more and more message collisions occur, the base station can change the bits in the downstream code words to authorize only a subset of the groups of NIUs to transmit upstream messages. By cyclically changing the contents of the downstream code words, the base station ensures that each group of NIUs is authorized to transmit upstream messages at least some of the time and that, at any given time, roughly the same number of NIUs are so authorized.

FIGS. 4(A)–(B) show horizontal and vertical downstream code words that define two 2D patterns in which each pattern identifies a different set of two groups of NIUs as being authorized to transmit upstream messages. For example, in FIG. 4(A), Groups 1 and 3 are so authorized (i.e., "ON"), because the horizontal and vertical bits associated with those two groups are both set, while Groups 2 and 4 are not authorized (i.e., "OFF"), because the horizontal and vertical bits associated with those two groups are not both set (in this case, only the vertical bit is set). By periodically cycling through the two 2D patterns (i.e., sending downstream code words that alternate between the two patterns), the base station ensures that all of the NIUs receive opportunities to transmit upstream messages, while at the same time reducing the rate of message collisions by restricting the number of NIUs that are authorized at any given time to transmit upstream messages.

If the rate of message collisions is still too large, the base station 102 can back off further by further reducing the number of groups of NIUs that are authorized to transmit upstream messages. FIGS. 5(A)–(D) show downstream code words that define four 2D patterns in which each pattern identifies a different single group of NIUs as being authorized to transmit upstream messages. By periodically cycling through these four 2D patterns, a further decrease in the rate of upstream transmission is achieved, reducing and possibly alleviating the problems of having too many message collisions.

Implementation Rule #1 with 4-Bit Words

In the example of Table I and FIGS. 2–5, the 2D patterns are (2×2) patterns defined by two 2-bit words (i.e., either assigned group words or downstream code words). In other implementations, the patterns may be defined by group and code words having other sizes. For example, in the case of two 4-bit group words, 16 different groups of NIUs are possible, as shown in FIG. 6.

The greater the number of bits in the group and code words, the greater the number of levels that will be available in a back-off scheme. For example, for the 16 different groups of NIUs shown in FIG. 6, a back-off scheme can be devised to define the following eight different back-off levels:

| | |
|---|---|
| 1st Back-Off Level: | 12 of the 16 different groups of NIUs are authorized to transmit upstream messages (i.e., "ON") at each phase of a four-pattern cycle, as shown in FIGS. 7(A)–(D). |
| 2nd Back-Off Level: | 9 of the 16 different groups of NIUs are ON at each phase of a four-pattern cycle, as shown in FIGS. 8(A)–(D). |
| 3rd Back-Off Level: | 8 of the 16 different groups of NIUs are ON at each phase of a two-pattern cycle, as shown in FIGS. 9(A)–(B). |
| 4th Back-Off Level: | 6 of the 16 different groups of NIUs are ON at each phase of an eight-pattern cycle, as represented in Table II. |
| 5th Back-Off Level: | 4 of the 16 different groups of NIUs are ON at each phase of a four-pattern cycle, as represented in Table III. |

-continued

6th Back-Off Level: 3 of the 16 different groups of NIUs are ON at each phase of a sixteen-pattern cycle, as represented in Table IV.
7th Back-Off Level: 2 of the 16 different groups of NIUs are ON at each phase of an eight-pattern cycle, as represented in Table V.
8th Back-Off Level: 1 of the 16 different groups of NIUs are ON at each phase of a sixteen-pattern cycle, as represented in Table VI.

TABLE II

FOURTH BACK-OFF LEVEL (6 GROUPS AT EACH PHASE)

| PATTERN | HORIZONTAL CODE WORD | VERTICAL CODE WORD |
|---|---|---|
| 1 | (1100) | (1110) |
| 2 | (0011) | (1110) |
| 3 | (1100) | (1101) |
| 4 | (0011) | (1101) |
| 5 | (1100) | (1011) |
| 6 | (0011) | (1011) |
| 7 | (1100) | (0111) |
| 8 | (0011) | (0111) |

TABLE III

FIFTH BACK-OFF LEVEL (4 GROUPS AT EACH PHASE)

| PATTERN | HORIZONTAL CODE WORD | VERTICAL CODE WORD |
|---|---|---|
| 1 | (0001) | (1111) |
| 2 | (0010) | (1111) |
| 3 | (0100) | (1111) |
| 4 | (1000) | (1111) |

TABLE IV

SIXTH BACK-OFF LEVEL (3 GROUPS AT EACH PHASE)

| PATTERN | HORIZONTAL CODE WORD | VERTICAL CODE WORD |
|---|---|---|
| 1 | (1000) | (1110) |
| 2 | (0100) | (1110) |
| 3 | (0010) | (1110) |
| 4 | (0001) | (1110) |
| 5 | (1000) | (1101) |
| 6 | (0100) | (1101) |
| 7 | (0010) | (1101) |
| 8 | (0001) | (1101) |
| 9 | (1000) | (1011) |
| 10 | (0100) | (1011) |
| 11 | (0010) | (1011) |
| 12 | (0001) | (1011) |
| 13 | (1000) | (0111) |
| 14 | (0100) | (0111) |
| 15 | (0010) | (0111) |
| 16 | (0001) | (0111) |

TABLE V

SEVENTH BACK-OFF LEVEL (2 GROUPS AT EACH PHASE)

| PATTERN | HORIZONTAL CODE WORD | VERTICAL CODE WORD |
|---|---|---|
| 1 | (1000) | (1100) |
| 2 | (0100) | (1100) |
| 3 | (0010) | (1100) |
| 4 | (0001) | (1100) |
| 5 | (1000) | (0011) |
| 6 | (0100) | (0011) |
| 7 | (0010) | (0011) |
| 8 | (0001) | (0011) |

TABLE VI

EIGHTH BACK-OFF LEVEL (1 GROUP AT EACH PHASE)

| PATTERN | HORIZONTAL CODE WORD | VERTICAL CODE WORD |
|---|---|---|
| 1 | (1000) | (1000) |
| 2 | (0100) | (1000) |
| 3 | (0010) | (1000) |
| 4 | (0001) | (1000) |
| 5 | (1000) | (0100) |
| 6 | (0100) | (0100) |
| 7 | (0010) | (0100) |
| 8 | (0001) | (0100) |
| 9 | (1000) | (0010) |
| 10 | (0100) | (0010) |
| 11 | (0010) | (0010) |
| 12 | (0001) | (0010) |
| 13 | (1000) | (0001) |
| 14 | (0100) | (0001) |
| 15 | (0010) | (0001) |
| 16 | (0001) | (0001) |

Each of these eight different back-off levels are designed to ensure that all of the different groups of NIUs are authorized to transmit upstream messages for an equal amount of time. In alternative schemes, such equality may not be necessary. For example, the two-pattern cycle shown in FIGS. 10(A)–(B) and represented in Table VII could be used for the first back-off level, instead of the four-pattern cycle of FIGS. 7(A)–(D). In this back-off level, only 12 of the 16 groups are authorized at any one time, as was the case the four-pattern cycle of FIGS. 7(A)–(D). However, under the two-pattern cycle of FIGS. 10(A)–(B), Groups 1–8 are always ON, while Groups 9–12 and Groups 13–16 alternate between ON and OFF between the two patterns. As such, the desired decrease in the rate of transmission is achieved, even though not all groups of NIUs are ON for the same amount of time.

TABLE VII

ALTERNATIVE FIRST BACK-OFF LEVEL

| PATTERN | HORIZONTAL CODE WORD | VERTICAL CODE WORD |
|---|---|---|
| 1 | (1111) | (1110) |
| 2 | (1111) | (1101) |

The sequences of patterns in the back-off levels may be selected to minimize the maximum time span during which any one NIU is not authorized to transmit upstream messages. When, for example, a particular group of NIUs is OFF in one pattern in the cycle for a particular back-off level, the next pattern in the cycle may be designed, if possible, such that that particular group of NIUs is ON. In alternative schemes within the scope of the present invention, this need not be the case.

Implementation Rule #2 with 4-Bit Words

In the above implementations, an NIU is authorized to transmit upstream messages if both of the bits in the two downstream code words corresponding to the bits in the group words assigned to the NIU are set (Implementation Rule #1). As shown in FIGS. 7–9 and Tables II–VI, Implementation Rule #1 provides a back-off scheme for 4-bit code words in which the eight back-off levels contain 12, 9, 8, 6, 4, 3, 2, and 1 groups of NIUs (out of 16 total) that are ON at each phase of the corresponding back-off level, respectively.

In an alternative implementation (i.e., Implementation Rule #2), an NIU is said to be authorized to transmit upstream messages if either of the bits in the two downstream code words corresponding to the bits in the group words assigned to the NIU is set. This alternative implementation provides a back-off scheme in which the eight back-off levels contain 15, 14, 13, 12, 10, 8, 7, and 4 groups of NIUs (out of 16 total) that are ON at each phase of the corresponding back-off level, respectively.

In general, Implementation Rule #2 can be used instead of Implementation Rule #1 when it is desirable to have finer control over the decrease in the rate of upstream transmission between the initial back-off levels, rather than between the final back-off levels as is the case with Implementation Rule #1. In a further alternative embodiment, a hybrid implementation rule may be used in which an additional bit is sent by the base station to the NIUs in the special data contained within the downstream frames to indicate whether Implementation Rule #1 or Implementation Rule #2 is to be applied. In such a hybrid implementation, for 4-bit code words, a back-off scheme can be designed to have 13 back-off levels containing 15, 14, 13, 12, 10, 9, 8, 7, 6, 4, 3, 2, 1 groups of NIUs that are ON at each phase of the corresponding back-off level, respectively. This hybrid implementation provides optimal rate control over the entire range of back-off levels, at the cost of an additional bit in the downstream frames.

In general, any of the various versions of the present invention can be implemented in conjunction with conventional back-off strategies such as those typically employed for the slotted ALOHA technique. When individual collisions do occur, as they inevitably will, they may be handled in the conventional manner. The present invention provides a scheme for reacting to large numbers of such collisions in a manner that reduces the number of collisions without drastically inhibiting the communications between the base station and any and all NIUs.

Although the present invention has been described in the context of two-dimensional patterns based on horizontal and vertical group and code words, in general, the present invention can be implemented using one-dimensional patterns based on a single group word and a single code word, as well as multi-dimensional patterns (e.g., 3D or higher) based on three or more group and code words.

If one or more NIUs in the system always need to be authorized to transmit upstream messages, then those special NIUs can be assigned group words in which all of the bits are set.

At startup, each NIU randomly selects one of the different groups. When an NIU is added to the network, the base station assigns the NIU to a group.

As described above, the back-off schemes of the present invention may be applied when the rate of message collisions becomes too great. The back-off schemes of the present invention can also be applied in other situations, such as when the base station is too busy to handle more upstream messages, thus controlling upstream traffic at the source before it even becomes a message link capacity problem.

In some telecommunications systems, the NIUs 104 shown in FIG. 1 correspond to a single channel group, and the base station 102 communicates with one or more additional channel groups of NIUs in addition to the channel group of FIG. 1. In such a system, each channel group of NIUs may be treated independently for purposes of bandwidth control with a unique pair of downstream code words for each channel group.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of controlling bandwidth in a packet-based data system comprising a base station and a plurality of network interface units (NIUs), comprising the steps of:
   (a) transmitting special data from the base station to the NIUs, wherein the NIUs are organized into two or more groups and the special data identify which groups of NIUs are authorized to transmit upstream messages to the base station; and
   (b) transmitting upstream messages to the base station from only authorized NIUs, wherein:
   each NIU is assigned two or more group words identifying its group;
   the special data contain authorization information identifying which groups of NIUs are authorized to transmit upstream messages to the base station;
   the authorization information is contained in two or more code words corresponding to a multi-dimensional pattern, where each code word corresponds to a different dimension of the multi-dimensional pattern; and
   each set of group words assigned to an NIU corresponds to a single location in the multi-dimensional pattern such that if the location in the multi-dimensional pattern corresponding to a particular group is set, then NIUs assigned to the particular group are authorized to transmit upstream messages to the base station.

2. The invention of claim 1, wherein the special data authorize different groups of NIUs to transmit upstream messages at different times.

3. The invention of claim 2, wherein the special data cyclically authorize different groups of NIUs to transmit upstream messages.

4. The invention of claim 1, wherein:
   the authorization information is contained in a horizontal code word and a vertical code word corresponding to a two-dimensional (2D) pattern;
   each set of one or more group words assigned to an NIU comprises a horizontal group word and a vertical group word; and
   each pair of horizontal and vertical group words corresponds to a single location in the 2D pattern such that, if the location in the 2D pattern corresponding to a particular group is set, then NIUs assigned to the particular group are authorized to transmit upstream messages to the base station.

5. The invention of claim 4, wherein the special data contain different horizontal and vertical code words to define different 2D patterns at different times.

6. The invention of claim 5, wherein the special data cyclically repeat a series of different 2D patterns.

7. The invention of claim 1, wherein the data system is a telecommunications system and each upstream message is a request from an NIU for bandwidth to set up a phone call.

8. A base station for a packet-based data system further comprising a plurality of network interface units (NIUs), wherein:

the base station is configured to transmit special data to the NIUs, wherein the NIUs are organized into two or more groups and the special data identify which groups of NIUs are authorized to transmit upstream messages to the base station;

only authorized NIUs are configured to transmit upstream messages to the base station;

each NIU is assigned two or more group words identifying its group:

the special data contain authorization information identifying which groups of NIUs are authorized to transmit upstream messages to the base station;

the authorization information is contained in two or more code words corresponding to a multi-dimensional pattern, where each code word corresponds to a different dimension of the multi-dimensional pattern; and each set of group words assigned to an NIU corresponds to a single location in the multi-dimensional pattern such that, if the location in the multi-dimensional pattern corresponding to a particular group is set, then NIUs assigned to the particular group are authorized to transmit upstream messages to the base station.

9. The invention of claim 8, wherein the special data authorize different groups of NIUs to transmit upstream messages at different times.

10. The invention of claim 9, wherein the special data cyclically authorize different groups of NIUs to transmit upstream messages.

11. The invention of claim 8, wherein:

the authorization information is contained in a horizontal code word and a vertical code word corresponding to a two-dimensional (2D) pattern;

each set of one or more group words assigned to an NIU comprises a horizontal group word and a vertical group word; and each pair of horizontal and vertical group words corresponds to a single location in the 2D pattern such that, if the location in the 2D pattern corresponding to a particular group is set, then NIUs assigned to the particular group are authorized to transmit upstream messages to the base station.

12. The invention of claim 11, wherein the special data contain different horizontal and vertical code words to define different 2D patterns at different times.

13. The invention of claim 12, wherein the special data cyclically repeat a series of different 2D patterns.

14. The invention of claim 8, wherein the data system is a telecommunications system and each upstream message is a request from an NIU for bandwidth to set up a phone call.

15. A network interface unit (NIU) for a packet-based data system, the packet-based data system further comprising a base station and one or more additional NIUs, wherein:

the base station is configured to transmit special data to the NIUs, wherein the NIUs are organized into two or more groups and the special data identify which groups of NIUs are authorized to transmit upstream messages to the base station;

only authorized NIUs are configured to transmit upstream messages to the base station;

each NIU is assigned two or more group words identifying its group;

the special data contain authorization information identifying which groups of NIUs are authorized to transmit upstream messages to the base station;

the authorization information is contained in two or more code words corresponding to a multi-dimensional pattern, where each code word corresponds to a different dimension of the multi-dimensional pattern; and each set of group words assigned to an NIU corresponds to a single location in the multi-dimensional pattern such that, if the location in the multi-dimensional pattern corresponding to a particular group is set, then NIUs assigned to the particular group are authorized to transmit upstream messages to the base station.

16. The invention of claim 15, wherein the special data authorize different groups of NIUs to transmit upstream messages at different times.

17. The invention of claim 16, wherein the special data cyclically authorize different groups of NIUs to transmit upstream messages.

18. The invention of claim 15, wherein:

the authorization information is contained in a horizontal code word and a vertical code word corresponding to a two-dimensional (2D) pattern;

each set of one or more group words assigned to an NIU comprises a horizontal group word and a vertical group word; and each pair of horizontal and vertical group words corresponds to a single location in the 2D pattern such that, if the location in the 2D pattern corresponding to a particular group is set, then NIUs assigned to the particular group are authorized to transmit upstream messages to the base station.

19. The invention of claim 18, wherein the special data contain different horizontal and vertical code words to define different 2D patterns at different times.

20. The invention of claim 19, wherein the special data cyclically repeat a series of different 2D patterns.

21. The invention of claim 15, wherein the data system is a telecommunications system and each upstream message is a request from an NIU for bandwidth to set up a phone call.

* * * * *